United States Patent [19]

Duderstadt et al.

[11] 4,155,392

[45] May 22, 1979

[54] PNEUMATIC TIRE

[75] Inventors: John F. Duderstadt, Cuyahoga Falls; Henry L. Gresens, Akron; Michael A. Kolowski, Tallmadge, all of Ohio

[73] Assignee: The Goodyear Tire & Rubber Company, Akron, Ohio

[21] Appl. No.: 826,825

[22] Filed: Aug. 22, 1977

Related U.S. Application Data

[63] Continuation of Ser. No. 490,803, Jul. 22, 1974, abandoned.

[51] Int. Cl.² .............................................. B60C 5/12
[52] U.S. Cl. .......................... 152/330 R; 152/201 R; 152/361 R
[58] Field of Search ........ 152/209 R, 330 R, 330 RF, 152/352–354, 361 R, 374; 264/315, 226; 156/123

[56] References Cited

U.S. PATENT DOCUMENTS

| | | | |
|---|---|---|---|
| 2,925,623 | 2/1960 | Beckadolph | 152/354 X |
| 3,205,931 | 9/1965 | Keefe, Jr. | 152/354 |
| 3,713,929 | 1/1973 | Bottasso et al. | 156/127 |
| 3,735,791 | 5/1973 | McKissick et al. | 152/352 |
| 3,765,977 | 10/1973 | Knight | 264/315 X |
| 3,837,986 | 9/1974 | Gorter et al. | 152/356 X |

Primary Examiner—Joseph F. Peters, Jr.
Assistant Examiner—D. W. Underwood
Attorney, Agent, or Firm—Frederick K. Lacher; Frank Pincelli

[57] ABSTRACT

A method of increasing the tread and sidewall life of a radial belted pneumatic tire with an open end belt in which the tire is cured in a mold with the central portion of the tread in a curved configuration having the same tread radius and the margins of the tread having an increased tread radius. The sidewalls are cured with the maximum sectional width of the tire spaced from the bead baseline a predetermined distance greater than 55 percent of the maximum section height of the tire so that upon inflation of the completely manufactured tire to design inflation pressure, the tread surface of the tire will have a substantially constant tread radius across the tread profile for even wear of the tread and the tension in the sidewalls will be reduced for increased life of the tire.

6 Claims, 5 Drawing Figures

PNEUMATIC TIRE

This is a Continuation of application Ser. No. 490,803 filed July 22, 1974, now abandoned.

This invention relates to a novel and improved pneumatic belted radial tire and a method of manufacturing the same.

Radial belted tires with open end belts have provided improved tire performance over tires with folded belts; however, when open end belts are used, the thread wear is uneven with the greatest wear being at the shoulders of the tire. At high speeds normally driven on freeways there is a problem with radial movement of the shoulders and the durability or life of the tire is not as great as it should be. These problems are believed to be caused by insufficient control of the tread radius of tires in the static and dynamic conditions and by high tensile stress in the sidewalls of the tires.

An object of this invention is to provide a radial belted tire with a unique molded shape of the tread and sidewall for increased wear and durability of the inflated tire in the static and dynamic conditions.

Another object is to provide a molded shape of the tread in which the center portion has a constant tread radius and the tread radius increases progressively toward the lateral edges.

A further object is to provide a molded shape of the sidewalls in which the position of the maximum section width of the tire as molded is located radially outward of the position of the maximum section width of the tire inflated to a natural shape.

A still further object is to provide a molded shape of the sidewalls in which the tension in the sidewalls is reduced upon inflation of the tire along with movement of the sidewalls toward a normal inflated position.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 2:
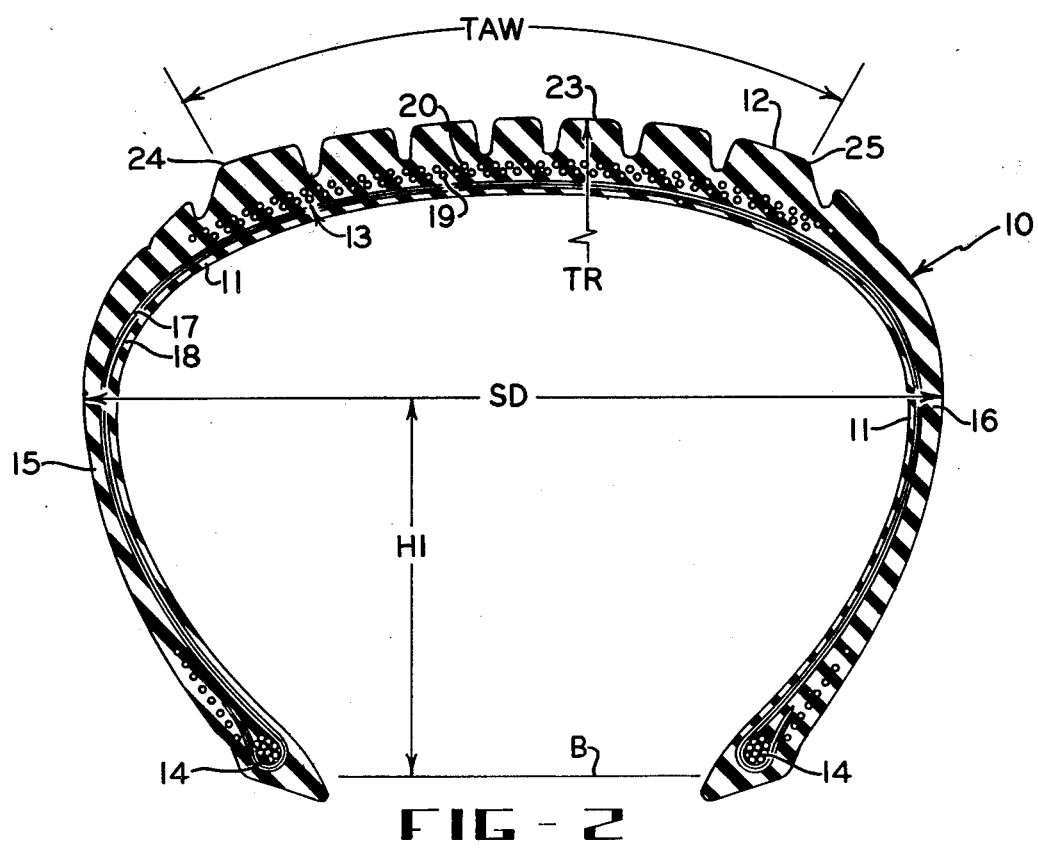
FIG. 2 is a cross-sectional view of an inflated tire made in accordance with this invention.

Referring to the drawings and in particular to FIG. 2, a pneumatic tire 10 made in accordance with this invention has a radial ply carcass 11 with a tread 12 disposed circumferentially about and radially outward of the carcass. A cord reinforced belt 13 is disposed circumferentially about the carcass 11 and beneath the tread 12. The carcass 11 terminates at its radially inner ends in a pair of beads 14. The carcass 11 and belt 13 each comprise plies of substantially parallel tire cords embedded in a body of rubber or other rubberlike body material extending between the beads 14. Sidewalls 15 and 16 extend between the beads 14 and thread 12.

Preferably, the carcass 11 has two radial plies 17 and 18; however, it is to be understood that one or more radial plies may be utilized. The radial plies 17 and 18 shown in this embodiment have cords extending at an angle of between 75° and 90° with respect to the mid-circumferential centerline X—X of the tread 12 at said centerline and are of any suitable material such as, by way of example only, nylon, rayon, polyester or wire. Also, for purposes of this invention, "mid-circumferential centerline" shall be a circle which lies on the tread surface midway between the lateral edges thereof and is contained in a plane perpendicular to the rotational axis of the tire. This plane containing the mid-circumferential centerline shall be referred to hereinafter as the "mid-circumferential plane".

The belt 13 is "open end" with an inner belt ply 19 and an outer belt ply 20 overlying and preferably wide than the inner belt ply. For purposes of this invention an "open end" belt has free or cut edges at the axially outer edges of the plies as contrasted to folded edge belts.

Figure 5:
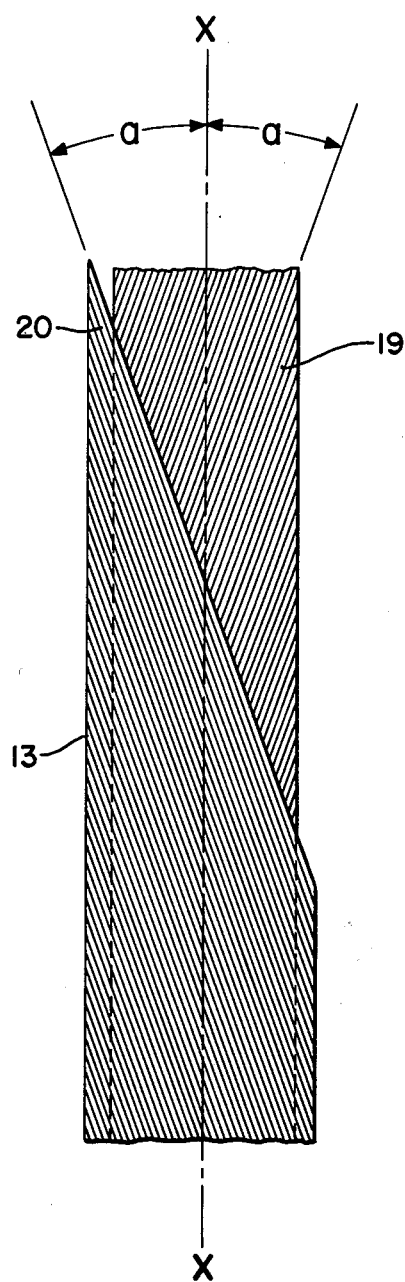
FIG. 5 is a schematic view of a cord reinforced belt constructed in accordance with this invention.

The cords in the inner belt ply 19 and outer belt ply 20 extend at an angle a of between 17° and 26° with respect to the mid-circumferential centerline X—X of the tread at said centerline as shown in FIG. 5 and are of any suitable high modulus material such as, by way of example only, steel, fiberglass or aramid having a modulus of at least 150 grams per denier.

As illustrated in FIG. 2, the tire 10 has, when mounted on a rim, a bead baseline B which extends parallel to the rotational axis of the tire and is spaced radially therefrom a distance equal to the nominal radius of the rim on which the particular tire is mounted. For purposes of this invention, all cross-sectional dimensions of the tire will be made with reference to the cross section of the tire as it appears in a plane within which lies the rotational axis of the tire.

The maximum cross-sectional width SD of the inflated tire is measured parallel to the rotational axis of the tire when the tire is mounted on a 70 percent rim, inflated to design pressure and in the normally loaded condition. As indicated at SD, the maximum cross-sectional width is equal to the distance between the outside surfaces of the tire at its widest point exclusive of any adornment, design, lettering or the like. For the purposes of this invention, "design pressure" shall mean the internal pressure to which the tire is designed to be inflated under normal operating conditions. Also, for purposes of this invention and as well known to skilled tire designers, a "70 percent rim" shall mean a rim having a lateral distance between the inside sides of the rim flanges as measured in a direction parallel to the rotational axis of the tire which is equal to 70 percent of the maximum cross-sectional width SD when the tire is mounted on the rim and inflated to design inflation pressure.

The maximum section height SH is the distance measured radially of the tire 10 from the bead baseline B to the radially outermost point on the tread 12 at the mid-circumferential centerline of the tread. The thread radius TR is the radius of an arc which coincides with an outer surface 23 of the tread 12. Also, for purposes of this invention, the tread arc width TAW is the distance between lateral edges 24 and 25 of the tread portion 12.

The lateral edges 24 and 25 are located at the laterally outermost points of the tread which touch the tread supporting surface when the tire is mounted on a 70 percent rim inflated to design pressure and statically loaded to design load. The "design load" for puposes of this invention shall be the load under which the tire is designed to be normally operated.

In the manufacture of a radial belted tire 10, the radial plies 17 and 18 and beads 14 are assembled on a generally cylindrical tire building drum into a carcass 11. Thereafter, the carcass 11 is shaped to a toroidal form and the inner belt ply 19, outer belt ply 20 and tread 12 are applied. The tire 10 is subsequently placed in a mold 26 with a curing bladder 27 inside the tire. The tire 10 is subsequently cured under heat and pressure for a predetermined length of time to vulcanize the rubber or other rubberlike body material uniting the radial plies 17 and 18, the inner belt ply 19, outer belt ply 20, the bead portions 14 and the tread 12 in an integral construction.

Figure 1:
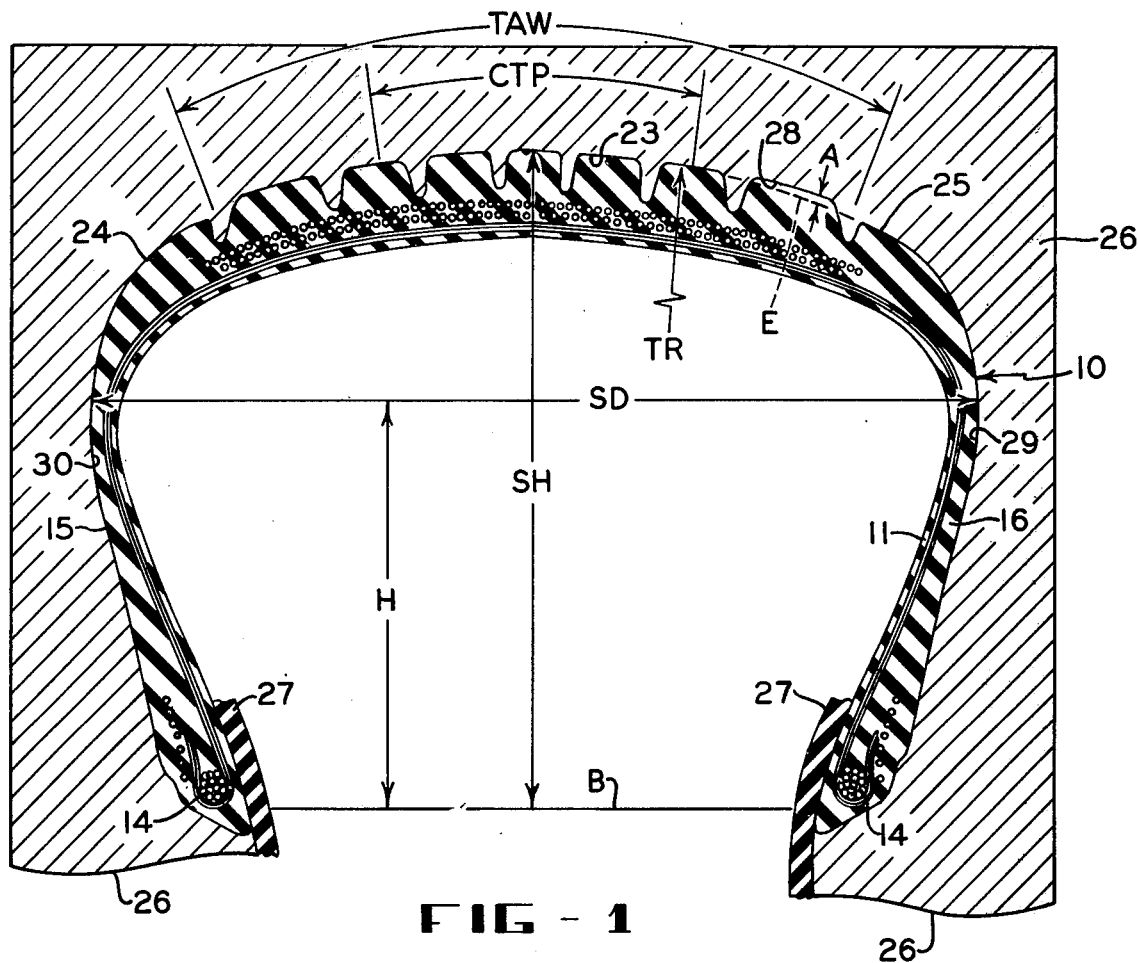
FIG. 1 is a cross-sectional view of a tire in a mold being cured in accordance with the method of this invention with parts of the mold and curing bladder being broken away.

With reference to FIG. 1 and in accordance with the present invention, the tire 10 is cured with the outer tread forming surface 23 of the mold 26 having a constant tread radius TR at a central tread portion indicated by the letters CTP. As shown in FIG. 1, the tread radius TR for the central tread portion CTP is a positive tread radius because the center of curvature of the central tread portion arc CTP is located radially inwardly of the tread 12 with respect to the rotational axis of the tire 10. Preferably, the central tread portion CTP has a width approximately one-half the tread arc width TAW of the tread 12. Laterally outward of the central tread portion CTP, the tread forming surface 28 of the mold 26 forms a tread surface in which the tread radius increases and remains positive. In the embodiment shown in FIG. 1, the tread forming surface is a surface of revolution generated by a straight line tangent to the surface 23 forming the central tread portion CTP and terminating in the recesses of the mold forming the lateral edges 24 and 25 of the tread 12. Accordingly, as shown in FIG. 1, the tire 10 is molded in a shape in which the molded contour is spaced radially outward of the constant tread radius extension of the central tread portion CTP indicated by dotted line E. This space is indicated by letter A in FIG. 1. The tread radius TR is not negative which would require the center of curvature of the central tread portion arc CTP and lateral edges 24 and 25 of the tread to be located radially outwardly of the tread 12 with respect to the rotational axis of the tire 10.

The mold 26 has a sidewall forming surfaces 29 and 30 for forming the sidewall portions 15 and 16 with the maximum cross-sectional width SD at a position spaced a predetermined distance from the bead baseline B preferably greater than 55 percent of the maximum section height SH of the tire 10, as shown in FIG. 1. The distance H of the maximum cross-sectional width SD from the bead baseline B in the preferred embodiment shown is 61.5 percent of the maximum section height SH of the tire 10. The mold 26 is also preferably made with the sidewall forming surfaces 29 and 30 located so that the beads 14 are molded at a spaced-apart distance greater than the lateral distance between the inside sides of the rim flanges of the 70 percent rim on which the tire of the invention is mounted.

After the tire 10 is cured, it is mounted on a rim. The tire 10 is then inflated to design pressure and assumes the tread profile or contour shown in FIG. 2 with the tread radius TR of the tread 12 being substantially constant across the tread profile. The tread radius TR at the central tread portion CTP is slightly greater than the tread radius at which the tire was cured and is held in this position by the inner belt ply 19 and outer belt ply 20 of the belt 13. At the lateral edges 24 and 25 of the tread, the tread radius TR is less than that at which the tire was cured and is substantially equal to the tread radius TR at the central tread portion CTP of the cured tire.

Figure 3:
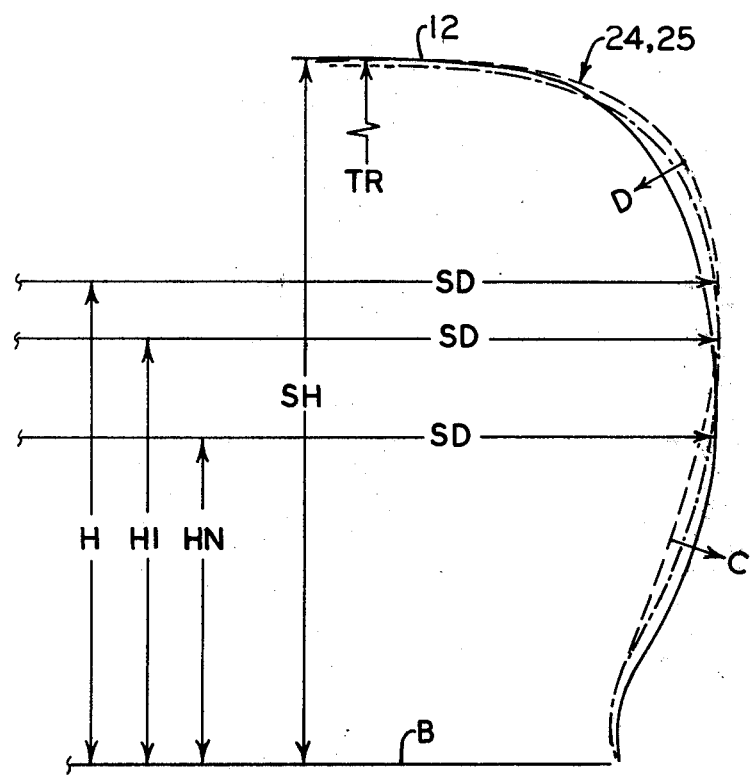
FIG. 3 is a schematic view showing the contour of the tire carcass of this invention first in the molded condition, second in the condition the tire would take if allowed to assume a "natural inflated shape" and third in the actual inflated condition of the tire.

The maximum cross-sectional width SD of the inflated tire shown in FIG. 2 is spaced from the baseline B a distance indicated by the letters HI which is closer to the bead baseline B than the distance H of the maximum cross-sectional width SD of the tire as molded, shown in FIG. 1. In FIG. 3, the contour of the tire as molded in mold 26 is shown in dotted lines and the contour of the tire as inflated is shown in chain-dotted lines. FIG. 3 shows in solid lines the natural shape the tire tends to assume under inflation by virtue of the specific geometry of the cords. The tire 10 of this invention does not take this shape because of the internal structure of the tire.

As shown in FIG. 3, the position of the maximum cross-sectional width for the inflated tire 10, indicated by chain-dotted lines, is at a distance HI from the bead baseline B which is less than the distance H of the maximum cross-sectional width SD of the molded tire, indicated by dotted lines. Both of these distances H and HI are greater than distance HN of the maximum cross-sectional width SD of an inflated tire in the natural shape indicated by the solid line in FIG. 3. It is believed that the inflation of the tire biases the lateral edges 24 and 25 of the tread 12 radially inward providing a constant tread radius TR across the tread profile in the static condition of the tire and thereby providing even wearing of the tread 12. The arrow D in FIG. 3 illustrates the movement of the shoulder of the tire radially inward from the dotted line position towards the solid line. Also the arrow C shown in FIG. 3 indicates the movement of the molded sidewall surface axially outward towards the solid line in the radially inner portion of the sidewalls 15 and 16 during inflation. This movement tends to decrease the tension in the sidewalls 15 and 16 and thereby increase the life of the tire 10.

Figure 4:
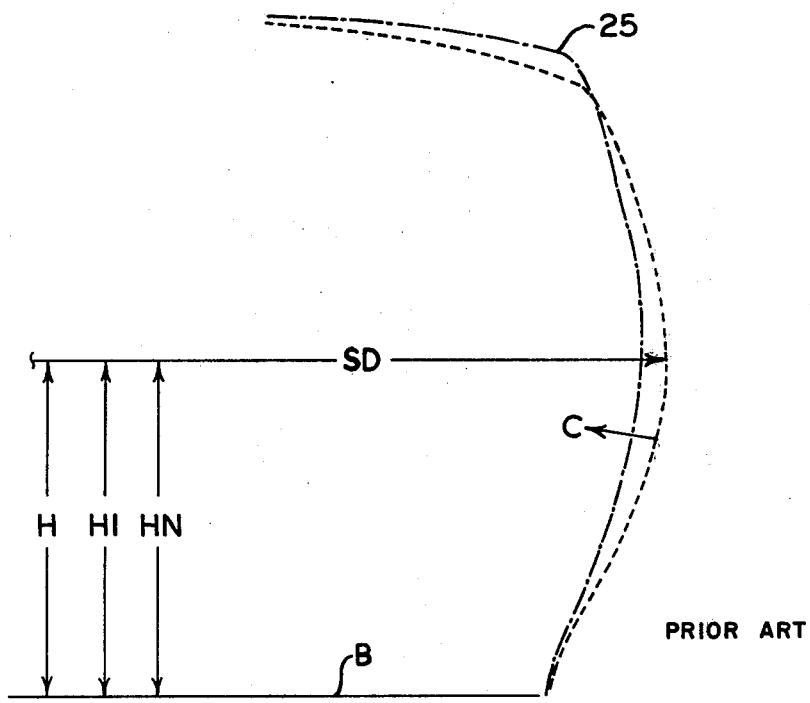
FIG. 4 is a schematic view showing the contour of a conventional radial belted tire in the molded and inflated condition.

In FIG. 4, the contour of a conventional radial belted pneumatic tire as molded is shown in dotted lines. The shape of the inflated tire is shown in chain-dotted lines. It can be seen that as the tire is inflated, the lateral edges expand radially causing a high shoulder and uneven tread wear. Also, the arrow C indicates the movement of the radially inner portion of the sidewall in a direction which increases the tension as opposed to the decrease in tension provided by the construction of the invention shown in FIG. 3. The position of the maximum cross-sectional width SD in the molded and inflated condition, indicated by letters H and HI, is substantially the same as the distance of the maximum cross-sectional width SD of the natural shape, indicated by the letters HN. Accordingly, there is substantially no interaction provided to hold the lateral edges 24 and 25 and shoulders down in the static and dynamic condition of the tire.

The superior tread wear obtainable by the method and construction of this invention is not easily shown by analysis of the stresses and strains in the tire and because of the complex interaction of the tire components and the complexity of the forces imposed upon the tire 10 in service. However, the reduction in tension in the sidewalls 15 and 16 may be demonstrated by a sidewall stress analysis in which a tire is mounted on a rim and inflated. The tire is then deflected and strain patterns obtained through the use of laser beams.

Sidewall stress analyses of two tires of substantially identical construction except as to the molding of the tires show that the maximum extension in the sidewall was decreased from 23.45 percent for the tire molded in a normal manner, as shown in FIG. 4, to 13.42 percent for the tire molded in accordance with the present invention and shown in FIGS. 1 and 2. The maximum extension is a direct indication of the tension stresses in the sidewall of the tire. The decrease in tension in the sidewalls 15 and 16 substantially increases the life of the tire 10.

The superiority of the tires constructed in accordance with the invention has been corroborated by field tests of tires under the same service conditions. Again, it was found that of the tires tested on the road, the tire 10 molded in accordance with the invention provided an increase in tread wear of 28 percent over the tread wear of a tire having the same construction and molded in a conventional mold as shown in FIG. 4. In these same tests the tire 10 of the invention also showed satisfactory handling, traction and hydroplaning characteristics.

While certain representative embodiments and details have been shown for the purpose of illustrating the invention, it will be apparent to those skilled in the art that various changes and modifications may be made therein without departing from the invention.

We claim:

1. A pneumatic tire of the type having a radial ply carcass of rubberlike material including sidewall portions and bead portions, a circumferentially extending tread portion and a cord reinforced belt, said belt having belt plies with cords extending at a cord angle between 17 and 26 degrees with respect to the mid-circumferential centerline of the tread portion, said cords of said belt plies being of a high modulus material, said tire being manufactured by assembling said radial ply carcass, shaping said carcass into toroidal form, applying said cord reinforced belt and said tread to said tire carcass, providing a mold having a tread forming surface with a positive and constant tread radius at a central portion and an increased positive tread radius at portions laterally outward of said central portion, said mold further having sidewall forming surfaces with the maximum cross-sectional width of said sidewall forming surfaces being spaced from a bead baseline of said mold a predetermined distance greater than 55 percent of the section height of the tire measured from the bead baseline to said tread forming surface of said mold, placing said tire carcass in a mold with a curing bladder inside the tire, and curing said tire in said mold under heat and pressure for a predetermined length of time to vulcanize said rubberlike material whereby the radial plies of said carcass, said cords of said belt plies, said bead portions and said tread are united in an integral tire construction and a constant tread radius is provided across the tread profile when the tire is inflated to design pressure.

2. A tire as claimed in claim 1 wherein said tire has an open end belt with an outer belt ply and an inner belt ply and said outer belt ply being wider than and overlying said inner belt ply.

3. A tire as claimed in claim 2 wherein said inner belt ply and said outer belt ply further comprise cords of steel.

4. A tire as claimed in claim 1 wherein said tread radius is constant over substantially one-half of the width of said tread forming surface of said mold.

5. A tire as claimed in claim 1 wherein the portions of said tread forming surface at the lateral edges are surfaces of revolution generated by straight lines of equal length tangent to said tread forming surface where said tread radius is positive, constant and extending axially outward over a distance equal to substantially one-half the width of said tread forming surface.

6. A tire as claimed in claim 1 wherein said predetermined distance at which said maximum section width of said sidewall portions is located is around 61.5 percent of the maximum section height of the tire.

* * * * *